United States Patent
Katagiri et al.

[11] Patent Number: 6,153,960
[45] Date of Patent: Nov. 28, 2000

[54] SMALL MOTOR WITH A COIL HAVING A CONTINUOUSLY WOUND WIRE

[75] Inventors: Masayuki Katagiri; Hiromitsu Takei, both of Nagano, Japan

[73] Assignee: Kabushiki Kaisha Sankyo Seiki Seisakusho, Nagano, Japan

[21] Appl. No.: 09/132,774

[22] Filed: Aug. 12, 1998

[30] Foreign Application Priority Data

Aug. 12, 1997 [JP] Japan .................................... 9-230281

[51] Int. Cl.$^7$ .................................................. H02K 1/24
[52] U.S. Cl. ........................... 310/269; 310/51; 310/219; 310/220; 310/233; 310/234; 310/235; 310/261; 310/268
[58] Field of Search ............................. 310/51, 219, 220, 310/221, 233, 269

[56] References Cited

U.S. PATENT DOCUMENTS

| | | | |
|---|---|---|---|
| 4,420,704 | 12/1983 | Mabuchi | 310/220 |
| 4,769,566 | 9/1988 | Matsuda | 310/40 MM |
| 4,859,893 | 8/1989 | Wang | 310/234 |
| 4,983,866 | 1/1991 | Lok | 310/43 |
| 5,095,239 | 3/1992 | Wang | 310/221 |
| 5,293,092 | 3/1994 | Strobl | 310/233 |
| 5,473,212 | 12/1995 | Crook et al. | 310/221 |
| 5,796,203 | 8/1998 | Wang | 310/233 |
| 5,895,990 | 4/1999 | Lau | 310/51 |

*Primary Examiner*—Elvin Enad
*Attorney, Agent, or Firm*—Sughrue, Mion, Zinn, Macpeak & Seas, PLLC

[57] ABSTRACT

When winding an armature coil start S of a winding is entwined around a riser R1, the wire is wound via a riser R4 around a salient pole P1 adjacent to the riser R4 and an opposed salient pole P2 to the salient pole P1 in order, and leads from a riser R3 through an opposed riser R6 to an adjacent salient pole P3 and an opposed salient pole P4. Next, it is passed to a riser R5 and is wound around an opposed riser R2, an adjacent salient pole P5, and a salient pole P6, then ends with the riser R4. A varistor 18 is inserted and three electrodes 19 are soldered to the corresponding risers R2, R4, and R6.

3 Claims, 5 Drawing Sheets

SMALL MOTOR WITH A COIL HAVING A CONTINUOUSLY WOUND WIRE

BACKGROUND OF THE INVENTION

1. Field of the Invention

This invention relates to a small brush DC motor of a 4-6 (4-magnetic-pole-6-salient-pole) structure comprising a varistor for extinguishing spark arcs and more particularly to means for winding wire around an armature core.

2. Related Art

As shown in FIG. 5, generally, in a structure of an armature 50 of a small brush DC motor of a 4-6 (4-magnetic-pole-6-salient-pole) structure, for wiring of coils 53 wound around six radially projecting salient poles 52 of an armature core 51 and six risers 55 electrically conducting as terminals of six commutators 54, a circuit is previously formed with a substrate or electrode print pattern 57 (hatched portion in the figure) formed as a thick film on one side of a ring varistor 56, the windings of the coils 53 wound around the six salient poles 52 are connected to the six risers 55 extended from the corresponding six commutators 54, and the electrode print pattern 57 of the ring varistor 56 are joined to the faces of the risers 55 by soldering 58, forming the armature 50.

The electrode print pattern 57 illustrated in FIG. 5 is a circuit pattern conducting so that a pair of two long and short risers formed interposing the rotation center of the armature therebetween becomes the same potential; three circuit patterns for the three pairs of risers are formed in the same shape and electrically independent of each other.

That is, the circuit pattern for electrically connecting a pair of risers, for example, extends from one long riser round the outside of a short riser in another pair adjacent to the pair through the lower side of a long riser in still another pair adjacent the pair to the associated short riser. The three circuit print patterns 57 are formed on one side of the ring varistor 56 and a pair of long and short risers is connected by soldering 58 for each print pattern 57. Further, the three circuit patterns are placed so as to separately contain three electrodes disposed in the ring varistor 56 and are electrically connected.

The above-described wiring structure uses the circuit formed in the ring varistor 56 as a part of a current diverting circuit of the coil 53 by the commutator 54.

However, to flatten and miniaturize a motor, it is difficult to place the electrode print pattern 57 in the ring varistor 56 and the ring varistor 56 is specifically designed and manufactured; it is unavoidable that the product becomes expensive.

Further, if the electrode print pattern 57 placed in the ring varistor 56 becomes small, it easily comes in contact with another pattern and positioning accuracy with the risers 55 becomes strict; it is feared that an electric short circuit may be produced when coil terminals are connected or soldered.

SUMMARY OF THE INVENTION

It is therefore an object of the invention to apply a normal ring varistor provided with three electrodes used with a general armature of a 2-3 (2-magnetic-pole-3-salient-pole) structure having three electrode parts in an armature in a 4-6 structure. It is accomplished by a coil winding method around salient poles that a normal 3-electrode varistor provides an overvoltage suppression effect equal to that of a varistor specifically designed for an armature of a 4-6 structure.

It is more particularly to solder three of six risers directly to three electrodes of a varistor together with coil winding terminals and solder only coil winding terminals to the remaining three risers each between the electrodes of the varistor for forming an armature, in short, route a coil winding around salient poles in a manner of drawing with a single stroke of a brush containing connection to the risers.

According to an aspect of the present invention, there is provided a small motor comprising:

an armature having six salient poles radially and a coil wound around the salient poles;

six risers connected to said coil;

commutators being joined to said risers in a one-to-one correspondence;

a ring varistor being connected to said riser for suppressing overvoltage;

a brush coming in sliding contact with said commutator for supplying a current; and a permanent magnet having four magnetic poles, placed facing the salient poles, wherein said coil includes one wire wound continuously around the six salient poles and the six risers from a winding start terminal to a winding end terminal and said ring varistor is provided with three electrode parts to which alternate three of said six risers are connected.

As described above, according to the small motor according to the invention, a general ring varistor used with an armature of a 2-3 (2-magnetic-pole-3-salient-pole) structure can be applied to a device for extinguishing spark arcs for suppressing overvoltage of an armature of a 4-6 (4-magnetic-pole-6-salient-pole) structure without special working and moreover a special wiring pattern is not used, thus part-to-part accuracy is not required and the structure and parts management can be simplified sufficiently.

Because of coil winding according to a pattern drawn with a single stroke of a brush, automation is facilitated and productivity can be improved. Further, the varistor can be miniaturized, so that the armature itself can be well fitted to miniaturization.

BRIEF DESCRIPTION OF THE DRAWINGS

FIG. 1a is a plan view of one embodiment of an armature of a small motor according to the invention and FIG. 1b is a sectional view taken on line B—B in FIG. 1a;

DETAILED DESCRIPTION OF THE PREFERRED EMBODIMENTS

Figure 1A:
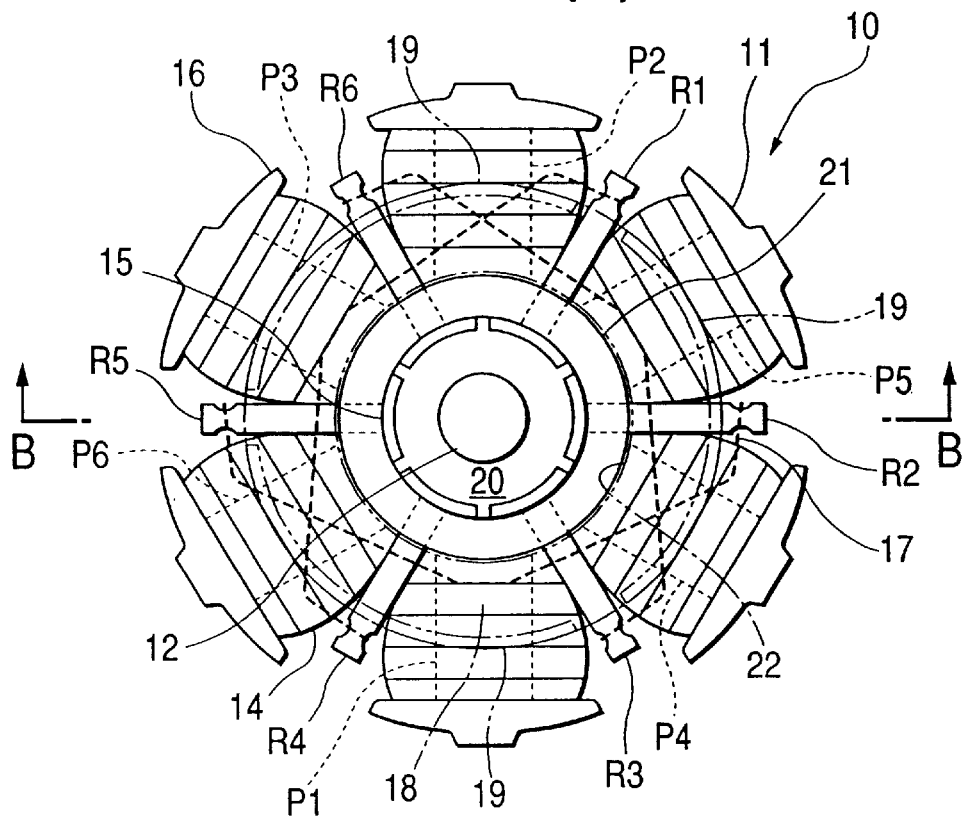
Figure 1B:
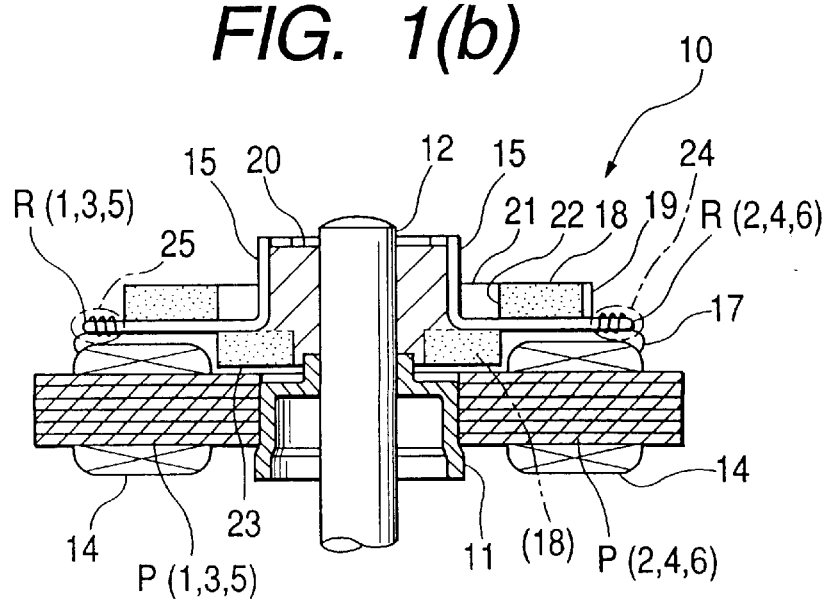

An embodiment of a small motor according to the invention will be discussed with reference to the accompanying drawings. FIG. 1a is a plan view to show an armature 10 of a small brush DC motor and FIG. 1b is a sectional view taken on line B—B in FIG. 1a. The structure of the small motor containing a brush coming in sliding contact with a commutator 15 for supplying a current and a permanent magnet having four magnetic poles, placed facing salient poles is known and is not shown.

A shaft 12 is inserted into the center of an armature core 11 and fixed and an insulator or insulating coating for electrically insulating coils 14 wound around salient poles P1–P6 is applied to the surface of the armature core 11, then a commutator holder 20 for separately insulating six commutators 15 joined to risers R1–R6 integrally and supporting in integral mold of insert (or outsert) mold is fixed to a predetermined position of the shaft 12 on one side of the armature core 11. A coil winder (not shown) is used to wind coils 14 around the salient poles P1–P6 extending radially from the center of the armature core 11 and each having a bow-shaped part 16 in the outer peripheral portion.

Figure 2A:
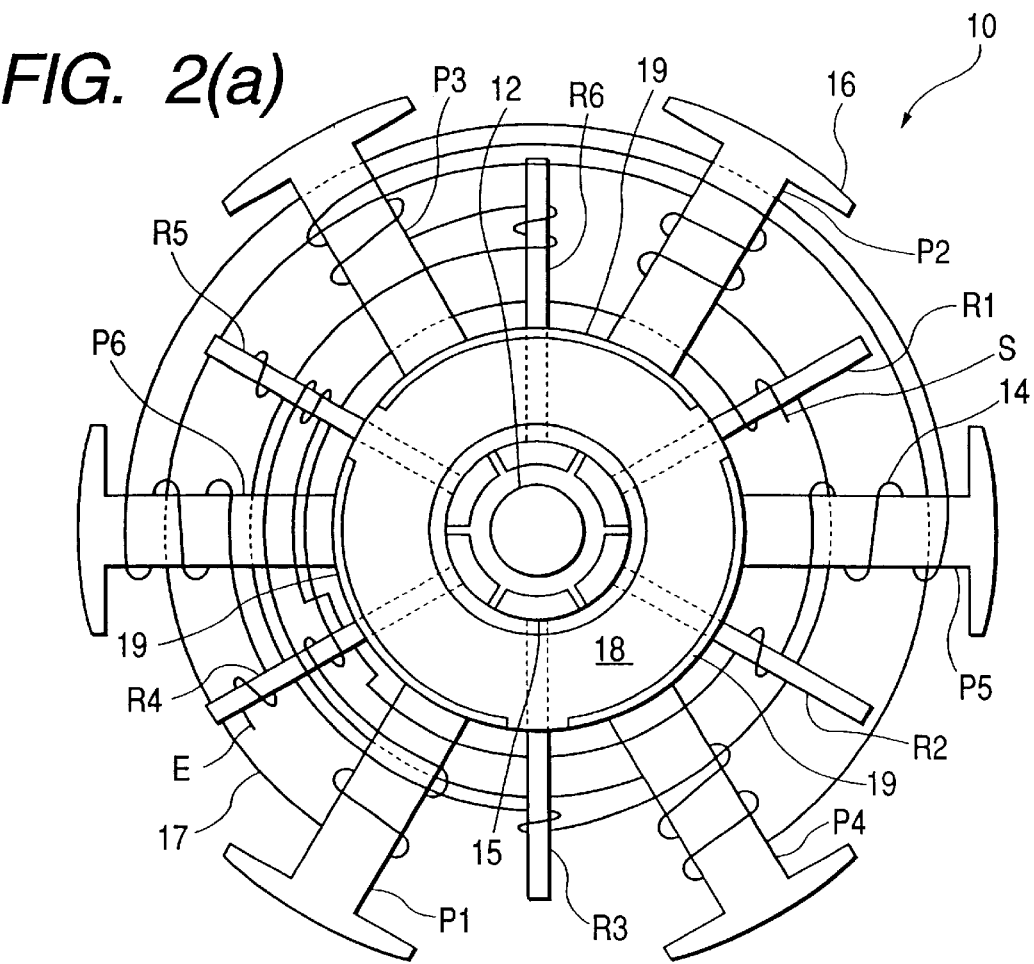
FIG. 2a is a schematic diagram and FIG. 2b is a wiring diagram to describe a winding pattern of armature coil windings of the small motor according to the invention.
Figure 2B:
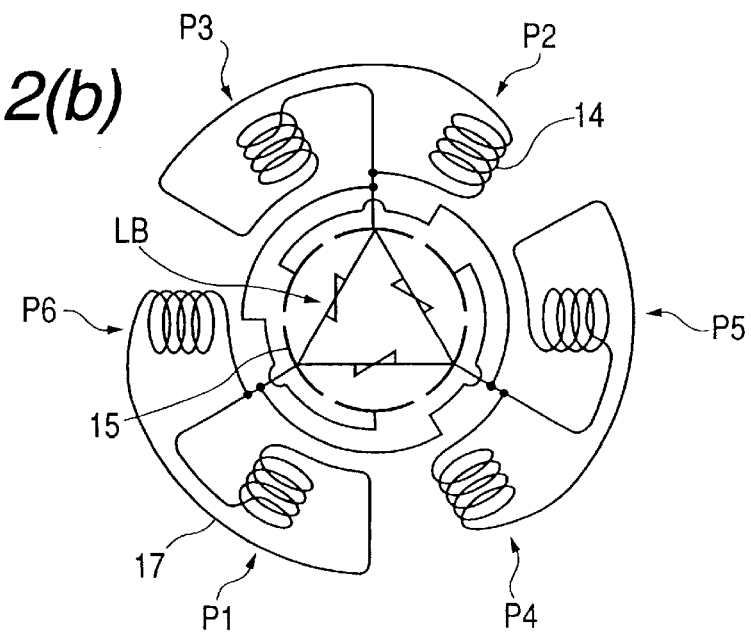

The winding means is schematically shown in FIG. 2a and a wiring diagram thereof is as shown in FIG. 2b. The illustration in FIG. 2a is furthermore expanded as a plane to a pattern drawn with a single stroke of a brush shown in FIG. 3a. For clarification, in FIGS. 3a–3c, the portion of the first pair of risers and a salient pole coil winding from the winding start and the portion of a pair of risers and a salient pole coil winding at the winding end are indicated by solid lines and the portion of an intermediate pair of risers and an intermediate salient pole coil winding is indicated by the dashed line. Although the lines in FIG. 3 are cut at both ends, A, B, C, and D shown corresponding to the left and right terminals of the lines are concatenated with the corresponding parts (letters) and the winding start S to the winding end E is formed by one continuous line as will be appreciated by those skilled in the art, of course.

Figure 3A:
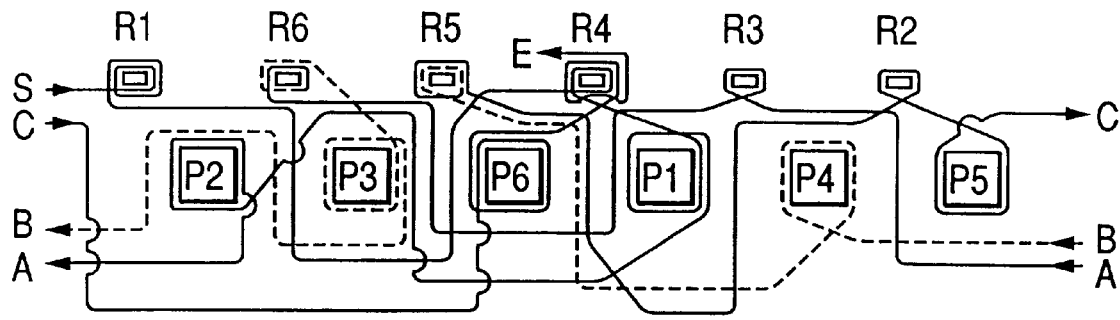
FIG. 3a is an expansion diagram of FIG. 2a to a pattern drawn with a single stroke of a brush to describe the armature coil windings of the small motor according to the invention and FIGS. 3b and 3c are other expansion diagram examples of patterns drawn with a single stroke of a brush.
Figure 3B:
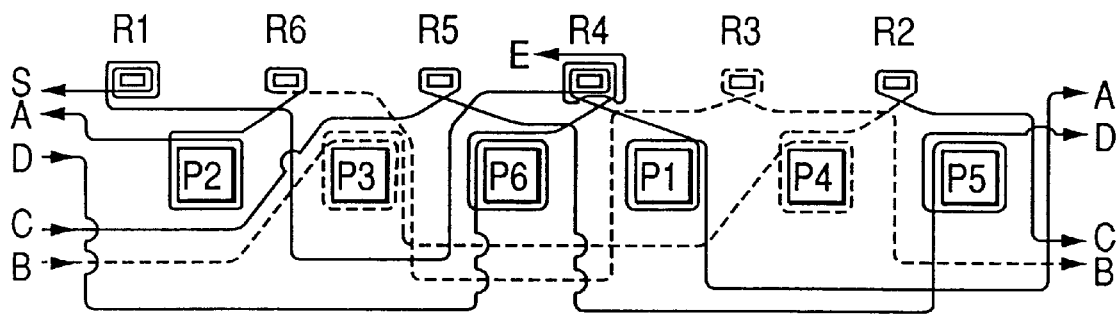
Figure 3C:
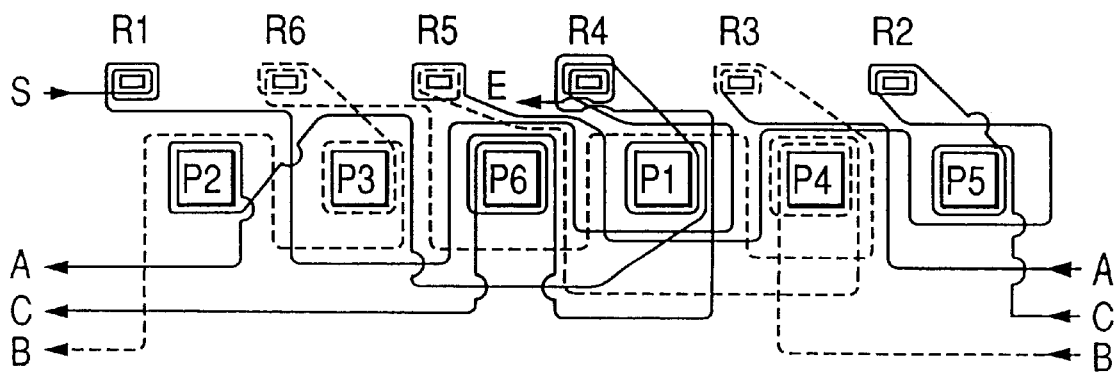

Reference numerals P1–P6 indicating the salient poles and R1–R6 indicating the risers in FIGS. 3a to 3c correspond to placement of the salient poles and the risers shown in FIG. 2a. Winding of coil 14 and winding 17 in a similar manner to the pattern drawn with a single stroke of a brush will be discussed with reference to FIG. 2a and FIG. 3a.

In FIG. 2a and FIG. 3a, when winding start S of the winding 17 (solid line) is entwined around the riser R1, the wire is wound via the opposed riser R4 symmetric with the riser R1 with respect to a point of the rotation center of the armature core 11. Next the wire is wound around the salient pole P1 adjacent to the riser R4 and the opposed salient pole P2 symmetric with the salient pole P1 with respect to a point of the rotation center of the armature core 11. Next the wire, exits the left line terminal A, enters the right line terminal A, is entwined around the riser R3, through the opposed riser R6, (dotted line) exits the left line terminal B from the adjacent salient pole P3, enters the right line terminal B, and leads to the opposed salient pole P4. Next, it is passed to the riser R5, (solid line) is entwined around the opposed riser R2, exits the right line terminal C from the adjacent salient pole P5, enters the left line terminal C, is wound around the salient pole P6, and the winding end terminal E is entwined around the riser R4.

This is represented as a string of the reference numerals (letters) as follows: S-R1-R4-P1-P2-(left A-right A)-R3-R6-P3-(left B-right B)-P4-R5-R2-P5-(right C-left C)-P6-R4-E. FIGS. 3b and 3c show other examples of patterns drawn with a single stroke of a brush. For simplicity, they are described in a similar manner that shown above.

FIG. 3b: S-R1-R4-P1-(right A-left A)-P2-R6-R3-(right B-left B)-P3-P4-R2-(left C-right C)-R5-P5-(right D-left D)-P6-R4-E.

FIG. 3c: S-R1-R4-P1-P2-(left A-right A)-R3-R6-P3-(left B-right B)-P4-R5-R2-P5-(right C-left C)-P6-R4-E.

According to any of such patterns, the coil 14 is wound around the salient poles P1-P6 containing connection to the risers R1–R6. That is, for the winding 17, a wire is wound around the salient poles P1–P6, then is entwined around the terminals of the risers R1–R6 from one salient pole to another. FIG. 3b is electrically equivalent to FIG. 3a independently of the connection order because the connection order is changed only in the two pairs of risers (R3 and R6 and R5 and R2) in FIG. 3a and the paired risers are the same potential. FIG. 3c differs from FIG. 3a only in how to route the winding 17; they are the same in the winding order around the salient poles and the risers. The patterns shown in FIGS. 3a–3c are examples and any other pattern is also sufficiently possible if it is a pattern drawn with a single stroke of a brush, needless to say.

Next, as shown in FIG. 1b, a varistor 18 is fitted into the outer diameter of a commutator holding ring 21 from the opposite side (top face in the figure) to the armature core 11 with respect to the commutator holder 20. The outer diameter of the commutator holding ring 21 is formed so as to show a loose fit to an annular inner face 22 of the varistor 18 for suppressing damage to the varistor caused by a forcible fit. The varistor 18 has three electrode parts 19 fixed to the three risers R2, R4, and R6 together with the winding 17 by soldering 24. Only the winding 17 is connected to other risers R1, R3, and R5 by soldering 25.

A small-diameter varistor 18 indicated by the phantom line in FIG. 1b can also be attached to the position of a flange part 23 of the commutator holder 20 from the armature core 11 side (lower face in the figure). At this time, the flange part 23 of the commutator holder 20 is shrunk in diameter so as to fit to the annular inner face 22 of the varistor 18.

Figure 4A:
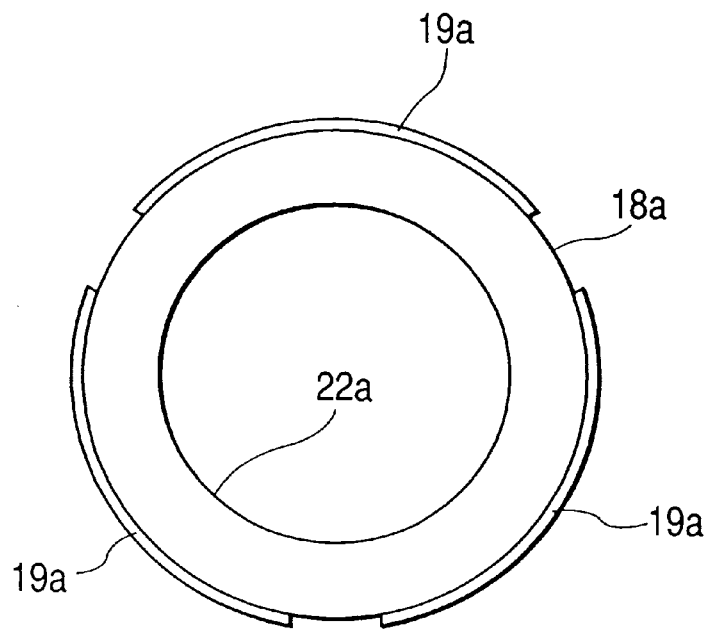
FIG. 4 shows embodiments of varistors used with the small motor according to the invention; 4a is a plan view of a varistor formed with electrode parts on an outer peripheral side face and 4b is a plan view of a varistor formed with electrode parts on one face.
Figure 4B:
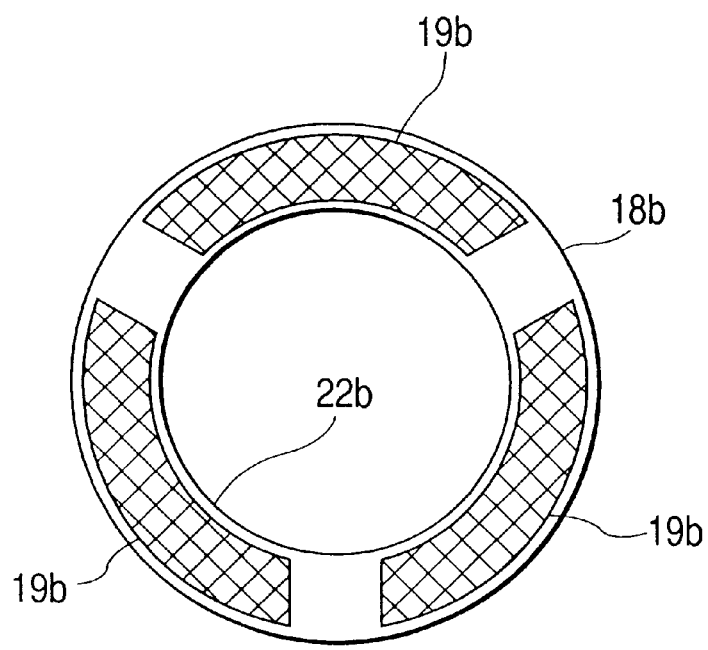
Figure 5:
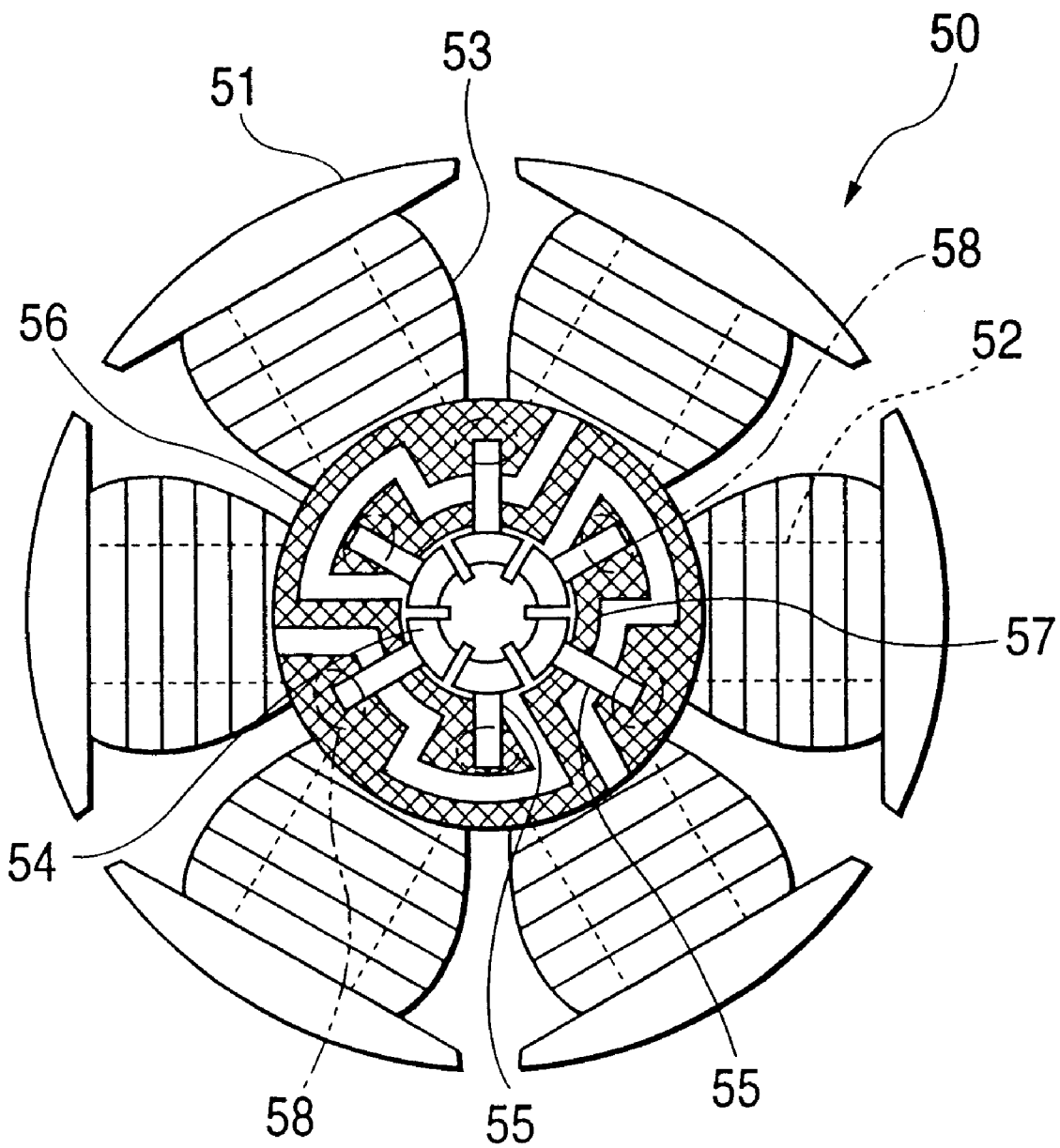
FIG. 5 is a plan view of an armature of a small motor in a related art.

FIG. 4 shows embodiments of the varistor 18; FIG. 4a shows a varistor 18a having three equal-sized electrode parts 19a insulated from each other on the outer peripheral side surface and an inner face 22a for a fit and 4b shows a varistor 18b having three equal-sized flat electrode parts 19a insulated from each other along the circumference on one face and an inner face 22b for a fit. The numeral 18 used above in the description denotes the varistor 18a shown in FIG. 4a.

That is, the varistor 18a, the electrodes 19a, and the inner face 22a in FIG. 4a correspond to the varistor 18, the electrodes 19, and the inner face 22 respectively. The varistor 18b shown in FIG. 4b can also function as the varistor 18 by soldering the electrode parts 19b to the risers R2, R4, and R6.

As described above, according to the small motor according to the invention, a general ring varistor used with an armature of a 2-3 (2-magnetic-pole-3-salient-pole) structure can be applied to a device for extinguishing spark arcs for suppressing overvoltage of an armature of a 4-6 (4-magnetic-pole-6-salient-pole) structure without special working and moreover a special wiring pattern is not used, thus part-to-part accuracy is not required and the structure and parts management can be simplified sufficiently.

Because of coil winding according to a pattern drawn with a single stroke of a brush, automation is facilitated and productivity can be improved. Further, the varistor can be miniaturized, so that the armature itself can be well fitted to miniaturization.

What is claimed is:

1. A small motor comprising:
  an armature having six salient poles radially arranged and a coil wound around the salient poles;

six risers connected to said coil;

commutators being joined to said risers in a one-to-one correspondence;

a ring varistor being connected to some of said risers for suppressing overvoltage;

a brush coming in sliding contact with said commutators for supplying a current; and a permanent magnet having four magnetic poles, placed facing the salient poles, wherein said coil includes one wire wound continuously around the six salient poles and the six risers from a winding start terminal to a winding end terminal and said ring varistor is provided with three electrode parts to which alternate three of said six risers are connected.

2. The small motor as claimed in claim 1 wherein said armature is formed by repeating three times a sequence of steps of connecting said coil to first and second ones of said risers symmetric with respect to a point of a rotation center of said armature, then winding said coil around a first one of said salient poles adjacent to the second riser, next, winding said coil around a second one of said salient poles symmetric with the first salient pole with respect to the point of the rotation center of said armature.

3. The small motor as claimed in claim 1 wherein said ring varistor has three electrode parts insulated from each other on an outer peripheral surface or one end face along a circumference of said varistor.

\* \* \* \* \*